United States Patent
Honma et al.

(10) Patent No.: US 9,194,341 B2
(45) Date of Patent: Nov. 24, 2015

(54) MULTISTAGE TURBOCHARGING SYSTEM

(71) Applicants: Tomohiro Honma, Tokyo (JP); Kenji Bunno, Tokyo (JP); Fumihiko Fukuhara, Tokyo (JP)

(72) Inventors: Tomohiro Honma, Tokyo (JP); Kenji Bunno, Tokyo (JP); Fumihiko Fukuhara, Tokyo (JP)

(73) Assignee: IHI CORPORATION (JP)

(*) Notice: Subject to any disclaimer, the term of this patent is extended or adjusted under 35 U.S.C. 154(b) by 0 days.

(21) Appl. No.: 14/134,004

(22) Filed: Dec. 19, 2013

(65) Prior Publication Data

US 2014/0130496 A1   May 15, 2014

Related U.S. Application Data

(63) Continuation of application No. PCT/JP2012/067455, filed on Jul. 9, 2012.

(30) Foreign Application Priority Data

Jul. 15, 2011   (JP) ................... 2011-156623

(51) Int. Cl.
  *F02B 33/44* (2006.01)
  *F02D 23/00* (2006.01)
  *F02B 33/00* (2006.01)
  *F02M 25/07* (2006.01)
  *F02B 37/013* (2006.01)
  *F02B 37/18* (2006.01)

(52) U.S. Cl.
  CPC .......... *F02M 25/0711* (2013.01); *F02B 37/013* (2013.01); *F02B 37/183* (2013.01); *Y02T 10/144* (2013.01)

(58) Field of Classification Search
  USPC ................... 60/612, 602; 123/562
  See application file for complete search history.

(56) References Cited

FOREIGN PATENT DOCUMENTS

| JP | 7-25248 | 5/1995 |
|---|---|---|
| JP | 2595658 | 5/1999 |
| JP | 2002-508473 | 3/2002 |
| JP | 2009-092026 | 4/2009 |
| JP | 2011-058425 | 3/2011 |
| WO | WO 99/31376 A1 | 6/1999 |

OTHER PUBLICATIONS

English machine translation for JP 2009-092026 A is U.S. Publication No. 2010/0187460.*
International Search Report and Written Opinion mailed Sep. 25, 2012 in corresponding PCT International Application No. PCT/JP2012/067455.
Office Action dated Jun. 2, 2015 issued in corresponding Chinese Patent Application No. 201280034384.8 with English translation.

* cited by examiner

*Primary Examiner* — Thai Ba Trieu
*Assistant Examiner* — Paul Thiede
(74) *Attorney, Agent, or Firm* — Ostrolenk Faber LLP

(57) ABSTRACT

A multistage turbocharging system (1) in which the thickness of at least either one of a valve body (51a) that opens and closes a bypass flow passage opening and a washer (51b) that fixes the valve body (51a) to a mounting portion (52) is greater than the minimum width of a flow passage from a valve assembly (51) to a turbine impeller (2d) of the first turbocharger (2).

5 Claims, 3 Drawing Sheets

MULTISTAGE TURBOCHARGING SYSTEM

This application is a Continuation of International Application No. PCT/JP2012/067455, filed on Jul. 9, 2012, claiming priority based on Japanese Patent Application No. 2011-156623, filed Jul. 15, 2011, the content of which is incorporated herein by reference in their entity.

TECHNICAL FIELD

The present invention relates to a multistage turbocharging system.

BACKGROUND ART

There has previously been proposed a two-stage turbocharging system (multistage turbocharging system) that is provided with two (multiple) turbochargers. This kind of two-stage turbocharging system, by being provided with two turbochargers of differing capacities, efficiently generates compressed air by changing the state of exhaust gas being supplied to the two turbochargers in accordance with the flow amount of exhaust gas supplied from an internal combustion engine.

In greater detail, the two-stage turbocharging system is for example provided with a low-pressure stage turbocharger that is supplied with exhaust gas that is discharged from the internal combustion engine (first turbocharger), a high-pressure stage turbocharger that is arranged further on the upstream than this low-pressure stage turbocharger (second turbocharger), and an exhaust bypass valve device that performs opening and closing of a bypass flow passage that supplies the exhaust gas that is discharged from the internal combustion engine to the low-pressure stage turbocharger by bypassing the turbine impeller of the high-pressure stage turbocharger.

As this kind of exhaust bypass valve device, it is possible to use the exhaust bypass valve device that is disclosed, for example, in Patent Document 2.

In the exhaust bypass valve device, in the case of closing the bypass flow passage by the exhaust bypass valve device, exhaust gas is supplied to the high-pressure stage turbocharger, and in the case of opening the bypass flow passage by the exhaust bypass valve device, exhaust gas is supplied to the low-pressure stage turbocharger.

PRIOR ART DOCUMENTS

Patent Documents

[Patent Document 1] Japanese Unexamined Patent Application, First Publication No. 2009-92026
[Patent Document 2] Published Japanese Translation No. 2002-508473 of the PCT International Publication

DISCLOSURE OF INVENTION

Problems to be Solved by the Invention

The exhaust bypass valve device is provided with a valve assembly that is constituted by a valve body that directly performs opening and closing of the bypass flow passage, and a washer that fixes the valve body to a mounting portion being coupled via a shaft portion. The exhaust bypass valve device performs opening and closing of the bypass flow passage by turning the mounting portion to cause the valve assembly to turn.

Since it receives a large load due to blocking the flow of exhaust gas or the like, this kind of valve assembly is designed so as to have a strength that can sufficiently withstand the load.

However, in the event of a abnormal situation such as the case of being used over a long time in an unintended operation condition, there is the possibility of the shaft portion of the valve assembly at which the largest stress acts undergoing fatigue failure, and the aforementioned washer and valve body falling out in the bypass flow passage.

There is the possibility of the washer and valve body that have dropped out in this way reaching the turbine impeller of the low-pressure stage turbocharger via the bypass flow passage, and the turbine impeller of the low-pressure stage turbocharger being damaged and no longer being able to perform generation of compressed air.

The present invention was achieved in view of the aforementioned circumstances, and has as its object to lower the possibility of the generation of compressed air immediately stopping, even in the remote chance of the shaft portion of the valve assembly undergoing fatigue failure in a multistage turbocharging system.

Means for Solving the Problems

The multistage turbocharging system according to the first aspect of the present invention is provided with a first turbocharger that is supplied with exhaust gas that is discharged from an internal combustion engine, a second turbocharger that is arranged more on the upstream in the flow of the exhaust gas than the first turbocharger, and an exhaust bypass valve device that performs opening and closing of a bypass flow passage that supplies the exhaust gas that is discharged from the internal combustion engine to the first turbocharger by bypassing the turbine impeller of the second turbocharger, in which the exhaust bypass valve device is provided with a valve assembly that is constituted by a valve body that opens and closes the bypass flow passage opening, and a washer that fixes the valve body to a mounting portion being coupled via a shaft portion, and the thickness of at least either one of the valve body and the washer being set to be greater than the minimum width of a flow passage from the valve assembly to the turbine impeller of the first turbocharger.

The multistage turbocharging system according to the second aspect of the present invention is characterized by, in the first invention, the thickness of the washer being set to be greater than the minimum width of the flow passage from the valve assembly to the turbine impeller of the first turbocharger, and the washer and the shaft portion being weld-joined.

The multistage turbocharging system according to the third aspect of the present invention is characterized by, in the multistage turbocharging system according to the first or second aspect, the thickness of at least either one of the valve body and the washer being set to be greater than the width of a diffuser that is formed around the turbine impeller of the first turbocharger.

Effects of the Invention

According to the present invention, the thickness of the valve body or the washer that the valve assembly is provided with is set to be greater than the minimum width of the flow passage from the valve assembly to the turbine impeller of the first turbocharger.

For this reason, even in the remote chance of the shaft portion of the valve assembly undergoing fatigue failure, the valve body or the washer cannot pass through the minimum width of the flow passage from at least the valve assembly to the turbine impeller of the first turbocharger, and so it is possible to reduce the possibility of it reaching the turbine impeller of the first turbocharger.

That is to say, according to the present invention, even in the remote chance of the shaft portion of the valve assembly undergoing fatigue failure, it is possible to prevent the valve body or the washer, which are components of the valve assembly, from damaging the turbine impeller.

As a result, since exhaust gas continues to be supplied to the turbine impeller of the first turbocharger, whereby the generation of compressed air is prolonged, it is possible to prevent the immediate stoppage of the generation of compressed air, and thereby possible to readily bring the vehicle to, for example, the nearest service station.

BRIEF DESCRIPTION OF THE DRAWINGS

FIG. 2A is an enlarged view that includes the turbine housing of the low-pressure stage turbocharger that the two-stage turbocharging system in one embodiment of the present invention is provided with.

FIG. 2B is an enlarged view that includes the turbine housing of the low-pressure stage turbocharger that the two-stage turbocharging system in one embodiment of the present invention is provided with.

FIG. 3 is an enlarged view of the valve assembly that the two-stage turbocharging system in one embodiment of the present invention is provided with.

EMBODIMENTS FOR CARRYING OUT THE INVENTION

Figure 1:
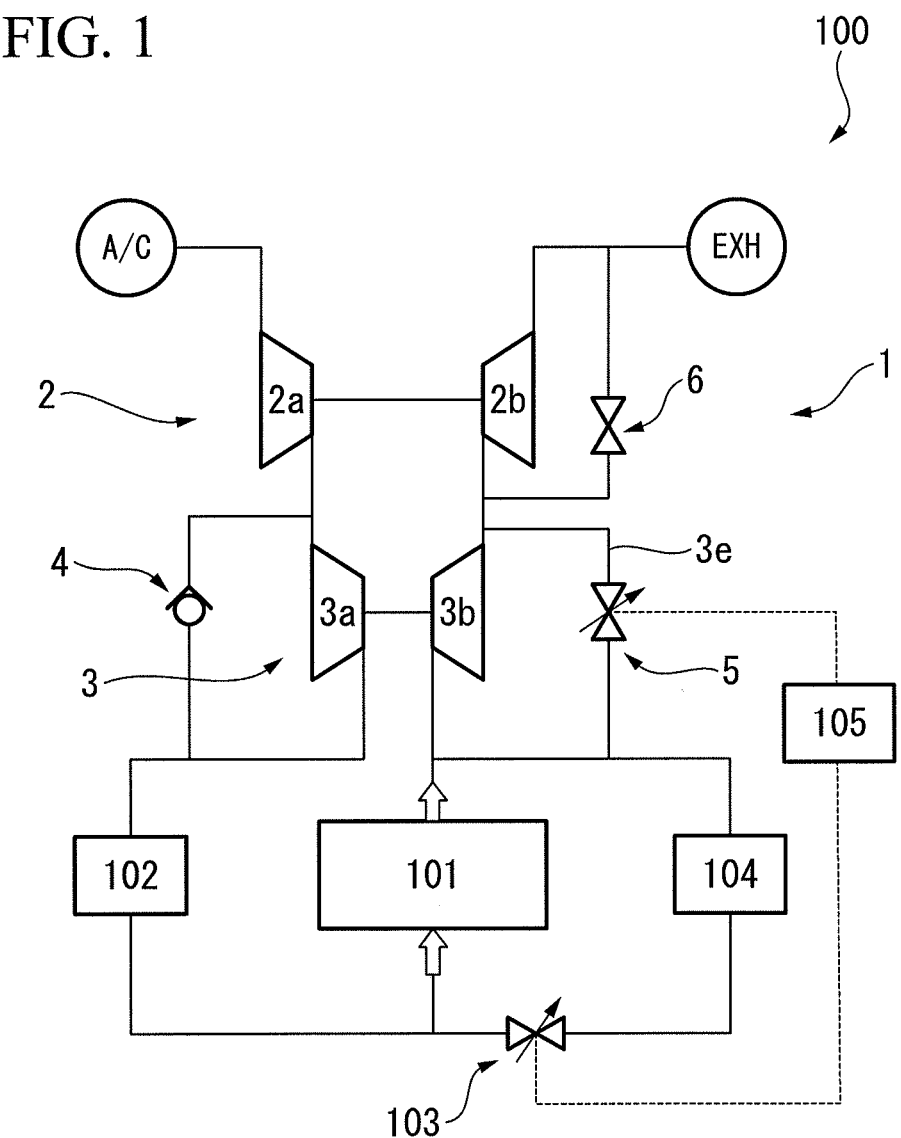
FIG. 1 is a schematic drawing that shows the outline configuration of an engine system provided with the two-stage turbocharging system in one embodiment of the present invention.

Hereinbelow, one embodiment of the multistage turbocharging system according to the present invention shall be described with reference to the drawings. Note that in the drawings given below, the scale of each member shall be suitably changed in order to make each member a recognizable size. Also, in the following description, as one example of a multistage turbocharging system, a two-stage turbocharging system that is provided with two turbochargers shall be described.

FIG. 1 is a schematic drawing that shows the outline constitution of an engine system 100 that is provided with a two-stage turbocharging system 1 of the present embodiment.

The engine system 100 is one that is mounted in a vehicle or the like, and is provided with a two-stage turbocharging system 1, an engine 101 (internal-combustion engine), an intercooler 102, an EGR (exhaust gas recirculation) valve 103, an EGR cooler 104, and an ECU (engine control unit) 105.

The two-stage turbocharging system 1 recovers energy that is included in the exhaust gas that is discharged from the engine 101 as rotational force, and generates compressed air that is supplied to the engine 101 by this rotational force.

This two-stage turbocharging system 1 has the characteristic of the present invention, and so shall be subsequently described in detail referring to the drawings.

The engine 101 functions as a power source of a vehicle in which it is mounted, generates power by combusting an air-fuel mixture of compressed air that is supplied from the two-stage turbocharging system and fuel, and supplies the exhaust gas that is generated by the combustion of the air-fuel mixture to the two-stage turbocharging system 1.

The intercooler 102 cools the compressed air that is supplied from the two-stage turbocharging system 1 to the engine 101, and is arranged between the two-stage turbocharging system 1 and an intake port of the engine 101.

The EGR valve 103 performs opening and closing of a return flow passage that returns a portion of the exhaust gas discharged from the engine 101 to the air intake side of the engine 101, with the opening degree thereof being adjusted by the ECU 105.

The EGR cooler 104 cools the exhaust gas to be returned to the air intake side of the engine 101 via the return flow passage, and is arranged on the upstream of the EGR valve 103.

The ECU 105 controls the entire engine system 100.

The ECU 105 in the engine system 100 controls the aforementioned EGR valve 103 and a discharge bypass valve device 5 described below in accordance with the rotational frequency of the engine 101 (that is to say, the flow amount of exhaust gas).

In the engine system 100 that has this kind of constitution, when the exhaust gas that is produced by the combustion of the air-fuel mixture in the engine 101 is discharged, a portion of the exhaust gas is returned to the air intake side of the engine 101 via the EGR cooler 104, while most of the exhaust gas is supplied to the two-stage turbocharging system 1. Compressed air is generated in the two-stage turbocharging system 1, and this compressed air is supplied to the engine 101 after being cooled by the intercooler 102.

Next, the two-stage turbocharging system 1 shall be described in detail.

As shown in FIG. 1, the two-stage turbocharging system 1 is provided with a low-pressure stage turbocharger 2 (first turbocharger), a high-pressure stage turbocharger 3 (second turbocharger), a check valve 4, an exhaust bypass valve device 5, and a waste gate valve 6.

The low-pressure stage turbocharger 2 is arranged more to the downstream than the high-pressure stage turbocharger 3 in the flow direction of the exhaust gas, and is constituted to be larger than the high-pressure stage turbocharger 3.

This low-pressure stage turbocharger 2 is provided with a low-pressure stage compressor 2a and a low-pressure stage turbine 2b.

The low-pressure stage compressor 2a is provided with a compressor impeller and a compressor housing that surrounds the compressor impeller and in which an air flow passage is formed.

Also, the low-pressure stage turbine 2b is provided with a turbine impellor and a turbine housing that surrounds the turbine impeller and in which an exhaust gas flow passage is formed.

The compressor impeller and the turbine impeller are coupled by a shaft, and compressed air is generated by the compressor impeller being rotatively driven by the turbine impeller being rotatively driven by the exhaust gas.

The high-pressure stage turbocharger 3 is arranged more to the upstream than the low-pressure stage turbocharger 2 in the flow direction of the exhaust gas. This high-pressure stage turbocharger 3 is provided with a high-pressure stage compressor 3a and a high-pressure stage turbine 3b.

The high-pressure stage compressor 3a is provided with a compressor impeller, and a compressor housing that surrounds the compressor impeller and in which an air flow passage is formed.

Also, the high-pressure stage turbine 3b is provided with a turbine impellor, and a turbine housing that surrounds the turbine impeller and in which an exhaust gas flow passage is formed.

The compressor impeller and the turbine impeller are coupled by a shaft, and compressed air is generated by the compressor impeller being rotatively driven by the turbine impeller being rotatively driven by the exhaust gas.

Figure 2A:
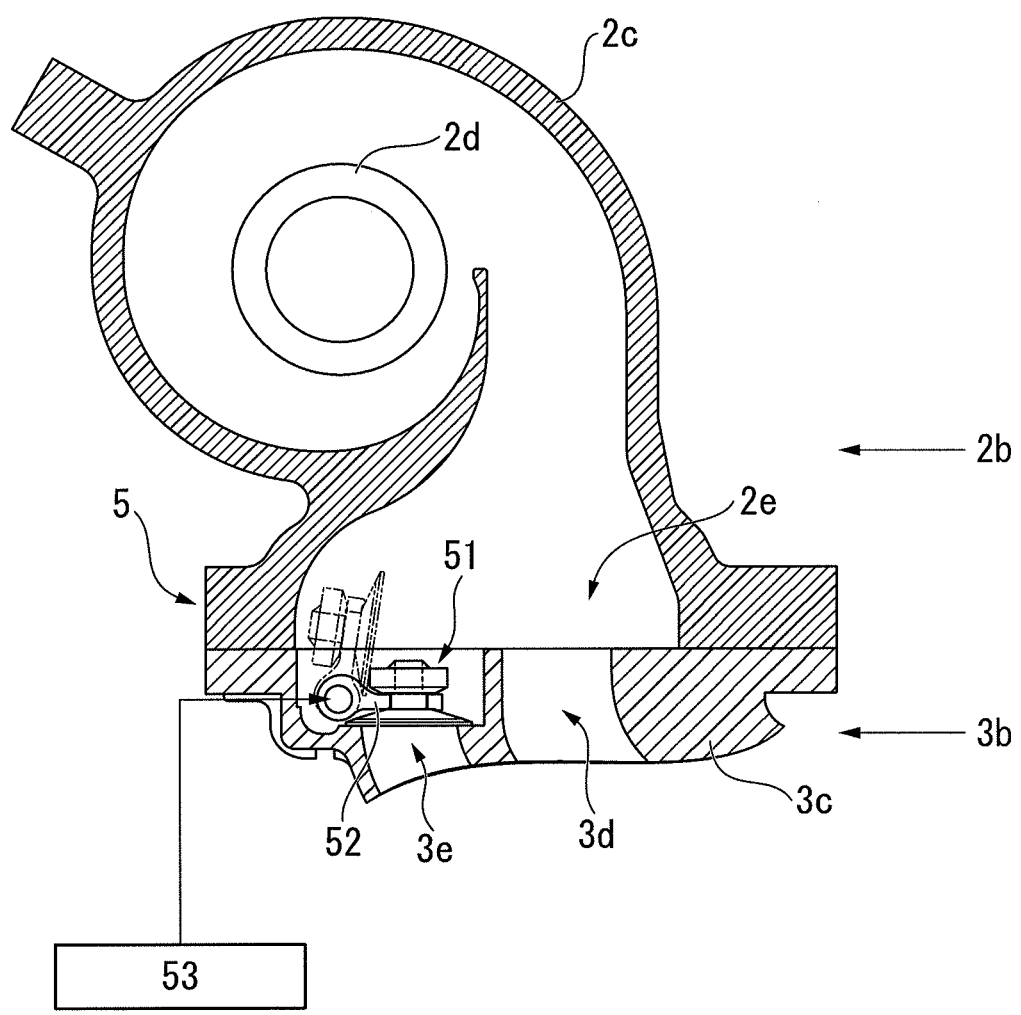

Note that as shown in FIG. 2A, the turbine housing 2c of the low-pressure stage turbine 2b and the turbine housing 3c of the high-pressure stage turbine 3d are joined by their flanges being butt-joined.

Inside of the turbine housing 3c of the high-pressure stage turbine 3b, an exhaust flow passage 3d that discharges exhaust gas that has passed through the turbine impeller of the high-pressure stage turbine 3b and a bypass flow passage 3e for supplying exhaust gas to the low-pressure stage turbine 2b without involving this turbine impeller are provided.

Also, a supply flow passage 2e for supplying exhaust gas to the turbine impeller 2d of the low-pressure stage turbine 2b is provided in the interior of the turbine housing 2c of the low-pressure stage turbine 2b.

By the joining of the turbine housing 2c of the low-pressure stage turbine 2b and the turbine housing 3c of the high-pressure stage turbine 3b, the exhaust flow passage 3d, the bypass flow passage 3e and the supply flow passage 2e are connected.

Figure 2B:
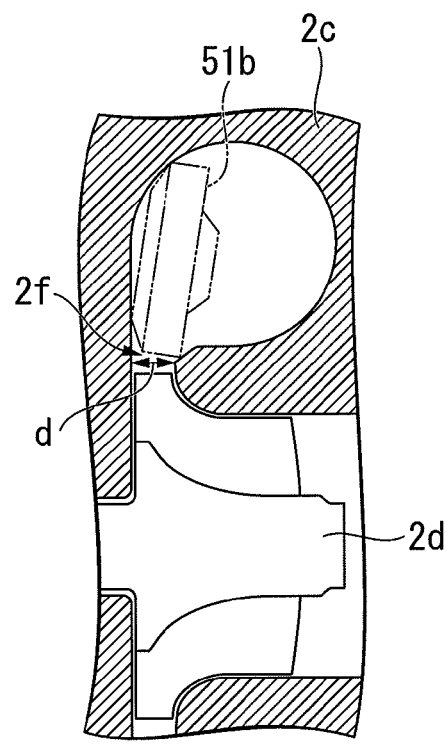

Also, as shown in FIG. 2A and FIG. 2B, the turbine impeller 2d is housed in the interior of the turbine housing 2c of the low-pressure stage turbine 2b. As shown in FIG. 2B, a diffuser 2f is provided so as to surround the turbine impeller 2d in the interior of the low-pressure stage turbine 2b.

This diffuser 2f is a site that rises in pressure by lowering the flow rate of the exhaust gas that is supplied to the turbine impeller 2d, and is the narrowest site in a flow passage from the valve assembly 51 that the exhaust bypass valve device 5 described below is provided with to the turbine impeller 2d of the low-pressure stage turbocharger 2. That is to say, in the present embodiment, the width d of the diffuser 2f is the minimum width of the flow passage from the valve assembly 51 to the turbine impeller 2d of the low-pressure stage turbocharger 2.

Returning to FIG. 1, the check valve 4 is provided in the bypass flow passage that supplies the compressed air that has been discharged from the low-pressure stage compressor 2a of the low-pressure stage turbocharger 2 to the air intake side of the engine 101 without involving the high-pressure stage compressor 3a, in the case of the high-pressure stage compressor 3a of the high-pressure stage turbocharger 3 not being driven. As shown in FIG. 1, the check valve 4 is constituted to allow the flow of compressed air from the low-pressure stage compressor 2a to the engine 101, and prevent the reverse flow of compressed air from the engine 101 to the low-pressure stage compressor 2a.

The exhaust bypass valve device 5 performs opening and closing of the bypass flow passage 3e for supplying exhaust gas that has been discharged from the engine 101 to the low-pressure stage turbocharger 2, bypassing the turbine impeller of the high-pressure stage turbocharger 3.

The exhaust bypass valve device 5 is provided with a valve assembly 51, a mounting plate 52 (mounting portion), and an actuator 53, as shown in FIG. 2A.

Figure 3:
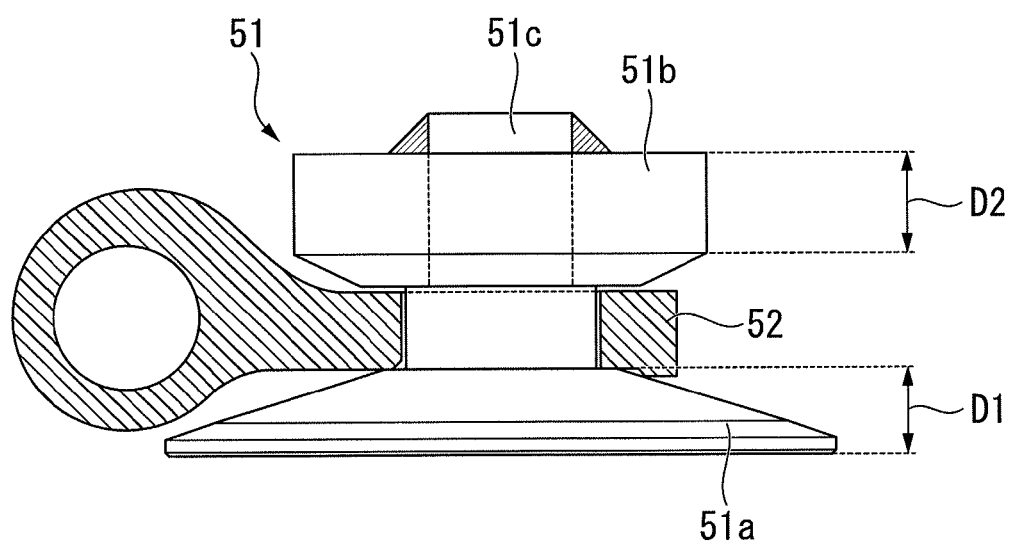

FIG. 3 is an enlarged view of the valve assembly 51 and the mounting plate 52.

As shown in this drawing, the valve assembly 51 has a constitution in which a valve body 51a that opens and closes the opening of the bypass flow passage 3e and a washer 51b that fixes the valve body 51a to the mounting plate 52 are coupled via a shaft portion 51c.

As shown in FIG. 2A, the valve assembly 51 is made rotatable so as to open and close the opening end of the bypass flow passage 3e, at the boundary region of the turbine housing 2c of the low-pressure stage turbine 2b and the turbine housing 3c of the high-pressure stage turbine 3b.

In the present embodiment, the thickness D1 of the valve body 51a is set to be greater than the width d of the aforementioned diffuser 2f. That is to say, in the present embodiment, the thickness D1 of the valve body 51a is set to be greater than the minimum width of the flow passage from the valve assembly 51 to the turbine impeller 2d of the low-pressure stage turbocharger 2.

Also, in the present embodiment, the thickness D2 of the washer 51b is also set to be greater than the width d of the aforementioned diffuser 2f. That is to say, in the present embodiment, the thickness D2 of the washer 51b is set to be greater than the minimum width of the flow passage from the valve assembly 51 to the turbine impeller 2d of the low-pressure stage turbocharger 2.

Also, in the present embodiment, a through hole is provided in the center of the washer 51b, and by the shaft portion 51c being inserted through the through hole of the washer 51b from the upper portion of the valve body 51a, the distal end of the shaft portion 51c is disposed to project out from the washer 51b.

Due to the distal end of the shaft portion 51c and the washer 51b being weld-joined, the shaft portion 51c and the washer 51b are fixed.

The mounting plate 52 has a through hole through which the shaft portion 51c is inserted, and the shaft portion 51c is inserted in the through hole, whereby the mounting plate 52 is sandwiched by the valve body 51a and the washer 51b.

The mounting plate 52 is rotated as shown by the chain double-dashed line in FIG. 2A by the drive force from the actuator 53 being transmitted via a link plate assembly that is not illustrated. The valve assembly 51 is also rotated by the rotation of the mounting plate 52.

Returning to FIG. 1, the waste gate valve 6 bypasses a portion of the exhaust gas that is discharged from the high-pressure stage turbocharger 3 or the exhaust gas that is discharged via the bypass flow passage 3e, without going through the turbine impeller 2d of the low-pressure stage turbocharger 2. Accordingly, the opening degree of the waste gate valve 6 is adjusted by the ECU 105 or a turbocharging pressure of the low-pressure stage compressor 2a.

According to the two-stage turbocharging system 1 of the embodiment as stated above, the thickness D1 of the valve body 51a and the thickness D2 of the washer 51b that the valve assembly 51 is provided with are set to be greater than the minimum width of the flow passage from the valve assembly 51 to the turbine impeller 2d of the low-pressure stage turbocharger 2.

For this reason, even in the remote chance of the shaft portion 51c of the valve assembly 51 undergoing fatigue failure, the valve body 51a and the washer 51b do not pass through the minimum width (the diffuser 2f) of the flow passage from the valve assembly 51 to the turbine impeller 2d of the low-pressure stage turbocharger 2, as shown in FIG. 2B. Accordingly, it is possible to prevent the valve body 51a and the washer 51b from reaching the turbine impeller 2d of the low-pressure stage turbocharger 2.

That is to say, according to the two-stage turbocharging system 1 of the embodiment, even in the remote chance of the shaft portion 51c of the valve assembly 51 undergoing fatigue failure, it is possible to prevent the valve body 51a and the washer 51b, which are components of the valve assembly 51, from damaging the turbine impeller 2d.

As a result, since exhaust gas continues to be supplied to the turbine impeller 2d of the low-pressure stage turbocharger 2, whereby the generation of compressed air is prolonged, it is possible to prevent the immediate stoppage of the generation of compressed air, and thereby possible to readily bring the vehicle to, for example, the nearest service station.

Also, in the embodiment, the thickness of both the valve body 51a and the washer 51b are set to be greater than the minimum width of the flow passage from the valve assembly 51 to the turbine impeller 2d of the low-pressure stage turbocharger 2.

However, since the valve body 51a has a larger diameter than the washer 51b, it is difficult for the valve body 51a to pass though the flow passage that bends from the valve assembly 51 to the turbine impeller 2d of the low-pressure stage turbocharger 2. For this reason, the thickness of the valve body 51a may be set regardless of the minimum width of the flow passage from the valve assembly 51 to the turbine impeller 2d of the low-pressure stage turbocharger 2, and only the thickness of the washer 51b may be set to be greater than the minimum width of the flow passage from the valve assembly 51 to the turbine impeller 2d of the low-pressure stage turbocharger 2.

Note that when considering only reducing the possibility of the washer 51b reaching the turbine impeller 2d of the low-pressure stage turbocharger 2, the thicker the thickness D2 of the washer 51b, the greater the effect.

However, as the thickness D2 of the washer 51b increases, interference between the washer 51b and the inner wall of the turbine housing 2c of the low-pressure stage turbocharger 2 more easily occurs, leading to a drop in the maximum aperture ratio of the valve body 51a. Accordingly, it is preferable to set the thickness D2 of the washer 51b to the maximum limit, within a range that can ensure the maximum aperture ratio of the valve body 51a that is sought.

On the other hand, only the thickness D1 of the valve body 51a may be set to be greater than the minimum width of the flow passage from the valve assembly 51 to the turbine impeller 2d of the low-pressure stage turbocharger 2. In this case, compared with case of only the thickness D2 of the washer 51b being set to be greater than the minimum width of the flow passage from the valve assembly 51 to the turbine impeller 2d of the low-pressure stage turbocharger 2 as stated above, and the case of the thicknesses of both the valve body 51a and the washer 51b being set to be greater than the minimum width of the flow passage, the effect of reducing the possibility of the washer 51b or the valve body 51a reaching the turbine impeller 2d of the low-pressure stage turbocharger 2 is relatively small. Nevertheless, compared with the case of the thickness D1 of the valve body 51a and the thickness D2 of the washer 51b both being set to be smaller than the minimum width of the flow passage as previously seen, even in the remote chance of the shaft portion 51c of the valve assembly 51 undergoing fatigue failure, the valve body 51a does not pass through the minimum width of the flow passage. Accordingly, that effect is greater compared to the previous example.

Also, in the present embodiment, the washer 51b and the shaft portion 51c are weld-joined.

Conventionally, the washer and the shaft portion are joined by crimping. However, in the present embodiment, since the thickness of the washer 51b is greater than conventional washers, its overall size is larger, leading to an increase in weight. For this reason, in the event of the washer and the shaft portion being joined by crimping, it is not possible to ensure a sufficient joint strength, and so there is the possibility of rattling occurring at the washer.

Therefore, the weld-joining of the washer 51b and the shaft portion 51c as in the present embodiment raises the joint strength of the washer 51b and the shaft portion 51c, and can prevent the occurrence of rattling at the washer 51b.

Note that grooves or through-holes may be formed in the washer 51b to achieve a weight savings in the washer 51b.

Also, in the present embodiment, the thickness of both the valve body 51a and the washer 51b are set to be greater than the width of the diffuser 2f.

The diffuser is a site where the flow passage width is narrowest in the flow passage from the valve assembly to the turbine impeller of the low-pressure stage turbocharger. For this reason, when setting the thickness of the valve body and the washer, by having the width of the diffuser serve as a reference, it is possible to easily set the thickness of the valve body and the washer to be greater than the minimum width of the flow passage from the valve assembly to the turbine impeller of the low-pressure stage turbocharger.

However, in the case of the width of the diffuser not being the minimum width of the flow passage from the valve assembly to the turbine impeller of the low-pressure stage turbocharger, it is also possible to set the thicknesses of the valve body and the washer to be greater than the minimum width, and less than the width of the diffuser.

Preferred embodiments of the present invention were described in detail hereinabove while referring to the appended drawings, but it goes without saying that the present invention is not limited to the above embodiments. The various shapes and combinations of each composite member shown in the embodiment described above refer to only a single example, and may be altered in various ways based on design requirements and so forth within a scope that does not deviate from the subject matter of the present invention.

For example, in the embodiment, a constitution provided with two turbochargers was described. However, the present invention is not limited to this, and moreover it is possible to adopt a constitution that is provided with a still greater plurality of turbochargers.

INDUSTRIAL APPLICABILITY

It is possible to lower the possibility of the generation of compressed air immediately stopping, even in the remote chance of the shaft portion of the valve assembly undergoing fatigue failure in a multistage turbocharging system.

DESCRIPTION OF REFERENCE NUMERALS 1 two-stage turbocharging system (multistage turbocharging system)
2 low-pressure stage turbocharger (first turbocharger)
2c turbine housing
2d turbine impeller
2f diffuser
3 high-pressure stage turbocharger (second turbocharger)
3c turbine housing
3e bypass flow passage
5 exhaust bypass valve device
51 valve assembly
51a valve body
51b washer
51c shaft portion
52 mounting plate (mounting portion)
101 engine (internal combustion engine)

The invention claimed is:

1. A multistage turbocharging system comprising:
a first turbocharger including a low-pressure stage compressor and a low-pressure stage turbine and configured to be supplied with exhaust gas discharged from an internal combustion engine;
a second turbocharger including a high-pressure stage compressor and a high-pressure stage turbine and configured to be arranged more on the upstream in the flow of the exhaust gas than the first turbocharger; and
an exhaust bypass valve device provided with a valve assembly including a valve body and a washer and configured to perform opening and closing of a bypass flow passage that supplies the exhaust gas discharged from the internal combustion engine to the first turbocharger by bypassing the turbine impeller of the second turbocharger, the valve body being configured to open and close an opening of the bypass flow passage, the washer being configured to fix the valve body to a mounting portion coupled via a shaft portion;
wherein the thickness of at least either one of the valve body and the washer being set to be greater than the minimum width of a flow passage from the valve assembly to the turbine impeller of the first turbocharger, and
wherein the minimum width of the flow passage is located to prevent either the valve body or the washer from reaching the turbine impeller of the first turbocharger.

2. The multistage turbocharging system according to claim 1 wherein the thickness of the washer is set to be greater than the minimum width of the flow passage from the valve assembly to the turbine impeller of the first turbocharger, and the washer and the shaft portion are weld-joined.

3. The multistage turbocharging system according to claim 1 wherein the thickness of at least either one of the valve body and the washer is set to be greater than the width of a diffuser that is formed around the turbine impeller of the first turbocharger.

4. The multistage turbocharging system according to claim 2 wherein the thickness of at least either one of the valve body and the washer is set to be greater than the width of a diffuser that is formed around the turbine impeller of the first turbocharger.

5. A multistage turbocharging system comprising;
a first turbocharger configured to include a low-pressure stage turbine;
a second turbocharger configured to include a high-pressure stage turbine coupled between an internal combustion engine and the low-pressure stage turbine and to include a bypass flow passage coupled to the internal combustion engine and the low-pressure stage turbine without passing through an impeller of the high-pressure stage turbine;
an exhaust bypass valve disposed in the bypass flow passage and provided with a valve assembly including a valve body and a washer,
wherein a thickness of at least either one of the valve body and the washer is greater than a minimum width of a flow passage from the valve assembly to an impeller of the low-pressure stage turbine.

* * * * *